(12) United States Patent
Milne et al.

(10) Patent No.: US 7,935,661 B2
(45) Date of Patent: May 3, 2011

(54) METHOD AND COMPOSITION TO INCREASE VISCOSITY OF CROSSLINKED POLYMER FLUIDS

(75) Inventors: Arthur Milne, Buenos Aires (AR); Manuel Jose Lastre Buelvas, Bogota (CO)

(73) Assignee: Schlumberger Technology Corporation, Suger Land, TX (US)

( * ) Notice: Subject to any disclaimer, the term of this patent is extended or adjusted under 35 U.S.C. 154(b) by 15 days.

(21) Appl. No.: 12/507,899

(22) Filed: Jul. 23, 2009

(65) Prior Publication Data

US 2010/0022418 A1    Jan. 28, 2010

Related U.S. Application Data

(60) Provisional application No. 61/137,183, filed on Jul. 28, 2008.

(51) Int. Cl.
 *C09K 8/68* (2006.01)
(52) U.S. Cl. ........ 507/217; 507/209; 507/211; 507/219; 507/240; 507/269; 166/250.01; 166/264; 166/270.1; 166/305.1
(58) Field of Classification Search .......................... None
See application file for complete search history.

(56) References Cited

U.S. PATENT DOCUMENTS

| | | | |
|---|---|---|---|
| 6,258,859 B1 * | 7/2001 | Dahayanake et al. | 516/77 |
| 6,410,489 B1 | 6/2002 | Zhang et al. | |
| 6,767,868 B2 * | 7/2004 | Dawson et al. | 507/236 |
| 6,767,869 B2 | 7/2004 | DiLullo et al. | |
| 7,148,183 B2 | 12/2006 | Quintero | |
| 7,151,076 B2 | 12/2006 | Qu et al. | |
| 7,261,160 B2 | 8/2007 | Welton et al. | |
| 7,326,670 B2 | 2/2008 | DiLullo et al. | |
| 7,343,972 B2 | 3/2008 | Willingham et al. | |

FOREIGN PATENT DOCUMENTS

WO    WO 9856497 A1 * 12/1998

* cited by examiner

*Primary Examiner* — John J Figueroa
(74) *Attorney, Agent, or Firm* — Martin Rzaniak; David Cate; Robin Nava (57) ABSTRACT

The invention discloses a well treatment composition for use in a subterranean formation comprising: a carrier fluid; and a viscoelastic surfactant being present in a concentration of less than about 1.5% by weight. Optionally, the fluid comprises a crosslinked polymer in a thickening amount in the carrier fluid. The invention also discloses a method to increase the viscosity of a fluid, the method comprising: providing a fluid comprising a thickening amount of a crosslinked polymer; adding a viscoelastic surfactant at a given concentration to the fluid; taking the fluid to a given temperature; defining a viscosity profile of the fluid depending of the concentration and the temperature; comparing said viscosity profile to a viscosity profile of the crosslinked polymer fluid alone; and defining an optimum concentration of the viscoelastic surfactant for each temperature.

13 Claims, 6 Drawing Sheets

METHOD AND COMPOSITION TO INCREASE VISCOSITY OF CROSSLINKED POLYMER FLUIDS

RELATED APPLICATIONS

The present application claims the benefit of U.S. Provisional Patent Application No. 61/137,183 filed Jul. 28, 2008, entitled Use of VES surfactants to increase the viscosity of hydrophilic polymer fluids and U.S. Non Provisional application Ser. No. 12/459,042 filed on Jun. 25, 2009, entitled Method and Composition to Increase Viscosity of Crosslinked Polymer Fluids, which are hereby incorporated by reference.

FIELD OF THE INVENTION

This invention relates to compositions and methods for treating subterranean formations penetrated by well bores. More particularly, the invention relates to enhance the production of oil or gas using a viscosifying agent based upon crosslinked polymer fluid showing increased viscosity.

BACKGROUND

The statements in this section merely provide background information related to the present disclosure and may not constitute prior art.

Polymers are used in a wide variety of ways to enhance the production of oil or gas from underground formations. Usually the function of the polymer is to control the viscosity of the aqueous fluids which are injected into the formation. For example, in water flooding the efficiency of the water flood is improved by adding a water soluble polymer to the aqueous phase and thereby decreasing the mobility difference between the injected water and the oil in place. Polymers are also used in acidizing and/or fracture acidizing in which acidic compositions are used to stimulate production of hydrocarbon from underground formations by increasing the formation porosity. A water soluble or water dispersible polymer is incorporated to increase the viscosity of the fluid so that wider fractures can be developed and live acid can be forced farther into the formations. This increases the proppant carrying capacity of the acid solutions and permits better fluid loss control.

Generally high molecular weight polymers or polymers with various gelling or crosslinking agents are used for this purpose. Most commercially available polymeric viscosifiers, however, are degraded by the hostile reservoir environment including high temperatures, acidity and extreme shear conditions, as well as by the electrolytes which are encountered in the oil recovery process. For example, hydrolyzed polyacrylamides fail in sea water solution at elevated temperatures due to precipitation of the polymer in the presence of calcium ions in the sea water. Xanthan polymers are insensitive to calcium ions but these polymers degrade at high temperatures and lose their viscosifying efficiency.

Also, conventional crosslinked polymer fracturing fluids have several inherent characteristics. The viscosity of a crosslinked polymer fluid with a given polymer concentration decreases with time and/or temperature. Hence the polymer concentration is increased in order to maintain a given or required viscosity for a longer period of time or to achieve the required viscosity at higher temperatures. The fluid loss control of the crosslinked polymer fluid in a formation with a given permeability is dependent to great extent on the polymer concentration. Increasing the polymer concentration in general will improve the fluid loss control as the polymer creates a filter cake on the face of the formation. Increasing polymer concentrations in the fluid result in lower fracture conductivity and retained permeability in the fracture faces. Both decrease the productivity of the final propped fracture. Exposure to high shear tends to degrade the properties of the crosslinked polymer fluid: to a lesser or greater degree the viscosity of the crosslinked fluid is reduced after it has been exposed to high shear (1000/s) which is common when displacing the fluid in a workstring to the perforations. The time for the fluid to recover viscosity after being exposed to high shear may take minutes and it is during this time that the fluid/proppant is entering into the hydraulic fracturing. The reduced viscosity of the fluid results in a narrower hydraulic fracture and so increase the risk of the proppant screening out in the well bore.

To combat these problems associated with polymeric gelling agents, some surfactants have been used as gelling agents. In particular cases, some surfactants, when mixed with an aqueous fluid having a certain ionic strength, are capable of forming a viscous fluid that has certain elastic properties, one of which may be shear thinning. Surfactant molecules (or ions) at specific conditions may form micelles (e.g., worm-shaped micelles, rod-shaped micelles, etc.) in an aqueous fluid. Depending on, among other things, the surfactant concentration, and the ionic strength of the fluid, etc., these micelles may impart increased viscosity to the aqueous fluid, such that the fluid exhibits viscoelastic behavior due, at least in part, to the association of the surfactant molecules contained therein.

As a result, these treatment fluids exhibiting viscoelastic behavior may be used in a variety of subterranean treatments where a viscosified treatment fluid may be useful. Because the micelles may be sensitive to the pH and hydrocarbons, the viscosity of these treatment fluids may be reduced after introduction into the subterranean formation without the need for conventional gel breakers (e.g., oxidizers). This may allow a substantial portion of the treatment fluid to be produced back from the formation without the need for expensive remedial treatments.

In the same way, fracturing fluids with viscoelastic surfactants have also several inherent characteristics. As a solids free fluid, they may not create residual damage in either proppant pack or the faces of the fractures. As a solids free fluid, they may have limited fluid loss control in high permeability formations. No filter cake is formed so the fluid loss may be a function of the viscosity of the fluid, permeability of the formation and properties of the reservoir fluids. One fluid can easily displace the other in the porous medium under reservoir conditions. High concentrations of surfactant are required to create a fluid with sufficient viscosity to create a hydraulic fracture in any formation with permeability greater than a few millidarcy. The viscosity of a fluid with a given concentration is very sensitive to any change in temperature above 150 Deg F. and in almost every case drops dramatically. Compatibility with formation crude as the VES viscosity is very sensitive to the presence of surfactants or demulsifiers.

The objective is to create a hybrid fluid which combines a low concentration of VES and a crosslinked polymer fluid. The final fluid will overcome to some degree the technical and economic disadvantages of crosslinked polymer and VES fluids taken separately.

SUMMARY

In an embodiment, a well treatment composition for use in a subterranean formation includes a carrier fluid, and a viscoelastic surfactant being present in a concentration of less than about 1.5% by weight. Optionally, the fluid comprises a crosslinked polymer in a thickening amount in the carrier fluid.

In another embodiment, the viscoelastic surfactant is present in a concentration of less than about 1% or less than about 0.8% by weight.

In a further embodiment, the crosslinked polymer may be one of polysaccharides, substituted galactomannans, guar gums, high-molecular weight polysaccharides composed of mannose and galactose sugars, guar derivatives, hydroxypropyl guar (HPG), carboxymethylhydroxypropyl guar (CM-HPG), carboxymethyl guar (CMG), hydrophobically modified guars, guar-containing compounds, synthetic polymers and mixtures thereof. The composition may further contain a co-surfactant. The viscoelastic surfactant may be a zwitterionic surfactant. In one embodiment, the viscoelastic surfactant is betaine. The carrier fluid may be any suitable medium, such as, but not limited to, an aqueous based fluid.

In a further aspect, a method of treating a subterranean formation from a well includes providing a carrier fluid comprising a viscoelastic surfactant in a concentration of less than about 1.5% by weight based upon total fluid weight, and introducing the fluid into the well. Optionally, the fluid comprises a crosslinked polymer in a thickening amount in the carrier fluid.

In one embodiment, the method further involves contacting the fluid and the subterranean formation. In a second embodiment, the method further includes fracturing the subterranean formation.

The fluid may have proppant. In another embodiment, the viscoelastic surfactant is present in a concentration of less than about 1% or less than about 0.8% by weight, based upon total fluid weight.

In a further aspect, a method to increase the viscosity of a fluid includes providing a fluid comprising a thickening amount of a crosslinked polymer, adding a viscoelastic surfactant at a given concentration to the fluid, adjusting the fluid to a given temperature, defining a viscosity profile of the fluid depending of the concentration and the temperature, comparing said viscosity profile to a viscosity profile of the crosslinked polymer fluid alone, and defining an optimum concentration of the viscoelastic surfactant for each temperature.

In an embodiment, the given temperature is between 45 deg C. and 95 deg C.

BRIEF DESCRIPTION OF THE DRAWINGS

The following figures form part of the present specification and are included to further demonstrate certain aspects of the present invention. The invention may be better understood by reference to one or more of these figures in combination with the detailed description of specific embodiments presented herein. The components in the figures are not necessarily to scale, with the emphasis instead being placed upon clearly illustrating principles of the present invention.

DETAILED DESCRIPTION

At the outset, it should be noted that in the development of any actual embodiments, numerous implementation-specific decisions must be made to achieve the developer's specific goals, such as compliance with system- and business-related constraints, which can vary from one implementation to another. Moreover, it will be appreciated that such a development effort might be complex and time consuming but would nevertheless be a routine undertaking for those of ordinary skill in the art having the benefit of this disclosure.

The description and examples are presented solely for the purpose of illustrating the embodiments of the invention and should not be construed as a limitation to the scope and applicability of the invention. While the compositions of the present invention are described herein as comprising certain materials, it should be understood that the composition could optionally comprise two or more chemically different materials. In addition, the composition can also comprise some components other than the ones already cited. In the summary of the invention and this detailed description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possession of the entire range and all points within the range.

The following definitions are provided in order to aid those skilled in the art in understanding the detailed description of the invention.

The term "fracturing" refers to the process and methods of breaking down a geological formation and creating a fracture, i.e. the rock formation around a well bore, by pumping fluid at very high pressures, in order to increase production rates from a hydrocarbon reservoir. The fracturing methods otherwise use conventional techniques known in the art.

The term "surfactant" refers to a soluble or partially soluble compound that reduces the surface tension of liquids, or reduces inter-facial tension between two liquids, or a liquid and a solid by congregating and orienting itself at these interfaces.

The term "viscoelastic" refers to those viscous fluids having elastic properties, i.e., the liquid at least partially returns to its original form when an applied stress is released.

The phrase "viscoelastic surfactant" or "VES" refers to that class of compounds which can form micelles (spherulitic, anisometric, lamellar, or liquid crystal) in the presence of counter ions in aqueous solutions, thereby imparting viscosity to the fluid. Anisometric micelles can be used, as their behavior in solution most closely resembles that of a polymer.

One embodiment is directed towards a well treatment composition for use in a subterranean formation comprising a carrier fluid; a crosslinked polymer; and a viscoelastic surfactant being present in a concentration of less than about 1.5% by weight.

The carrier fluid can generally be any liquid carrier suitable for use in oil and gas producing wells. One such liquid carrier is water. The liquid carrier can comprise water, can consist essentially of water, or can consist of water. Water will typically be a major component by weight of the fluid. The water can be potable or non-potable water. The water can be brackish or contain other materials typical of sources of water found in or near oil fields.

A salt may be present in the fluid carrier. The salt can be present naturally if brine is used, or can be added to the fluid carrier. For example, it is possible to add to water; any salt, such as an alkali metal or alkali earth metal salt ($NaCO_3$, NaCl, KCl, etc.). The salt is generally present in weight percent concentration between about 0.1% to about 5%, from about 1% to about 3% by weight. One useful concentration is about 2% by weight.

The crosslinked polymer can generally be any crosslinked polymers. The polymer viscosifier can be a metal-crosslinked polymer. Suitable polymers for making the metal-crosslinked polymer viscosifiers include, for example, polysaccharides such as substituted galactomannans, such as guar gums, high-molecular weight polysaccharides composed of mannose and galactose sugars, or guar derivatives such as hydroxypropyl guar (HPG), carboxymethylhydroxypropyl guar (CMHPG) and carboxymethyl guar (CMG), hydrophobically modified guars, guar-containing compounds, and synthetic polymers. Crosslinking agents based on boron, titanium, zirconium or aluminum complexes are typically used to increase the effective molecular weight of the polymer and make them better suited for use in high-temperature wells.

Other suitable classes of polymers effective as viscosifiers include polyvinyl polymers, polymethacrylamides, cellulose ethers, lignosulfonates, and ammonium, alkali metal, and alkaline earth salts thereof. More specific examples of other typical water soluble polymers are acrylic acid-acrylamide copolymers, acrylic acid-methacrylamide copolymers, polyacrylamides, partially hydrolyzed polyacrylamides, partially hydrolyzed polymethacrylamides, polyvinyl alcohol, polyalkyleneoxides, other galactomannans, heteropolysaccharides obtained by the fermentation of starch-derived sugar and ammonium and alkali metal salts thereof.

Cellulose derivatives are used to a smaller extent, such as hydroxyethylcellulose (HEC) or hydroxypropylcellulose (HPC), carboxymethylhydroxyethylcellulose (CMHEC) and carboxymethycellulose (CMC), with or without crosslinkers. Xanthan, diutan, and scleroglucan, three biopolymers, have been shown to have excellent proppant-suspension ability even though they are more expensive than guar derivatives and therefore have been used less frequently, unless they can be used at lower concentrations.

In other embodiments, the crosslinked polymer is made from a crosslinkable, hydratable polymer and a delayed crosslinking agent, wherein the crosslinking agent comprises a complex comprising a metal and a first ligand selected from the group consisting of amino acids, phosphono acids, and salts or derivatives thereof. Also the crosslinked polymer can be made from a polymer comprising pendant ionic moieties, a surfactant comprising oppositely charged moieties, a clay stabilizer, a borate source, and a metal crosslinker. Said embodiments are described in U.S. Patent Publications US2008-0280790 and US2008-0280788 respectively, each of which are incorporated herein by reference.

Linear (not cross-linked) polymer systems may be used. However, in some cases, may not achieve the full benefits because they may require more concentration, and may require a breaker. Any suitable crosslinked polymer system may be used, including for example, those which are delayed, optimized for high temperature, optimized for use with sea water, buffered at various pH's, and optimized for low temperature. Any crosslinker may be used, for example boron, titanium, zirconium, aluminum and the like. Suitable boron crosslinked polymers systems include by non-limiting example, guar and substituted guars crosslinked with boric acid, sodium tetraborate, and encapsulated borates; borate crosslinkers may be used with buffers and pH control agents such as sodium hydroxide, magnesium oxide, sodium sesquicarbonate, and sodium carbonate, amines (such as hydroxyalkyl amines, anilines, pyridines, pyrimidines, quinolines, and pyrrolidines, and carboxylates such as acetates and oxalates) and with delay agents such as sorbitol, aldehydes, and sodium gluconate. Suitable zirconium crosslinked polymer systems include by non-limiting example, those crosslinked by zirconium lactates (for example sodium zirconium lactate), triethanolamines, 2,2'-iminodiethanol, and with mixtures of these ligands, including when adjusted with bicarbonate. Suitable titanates include by non-limiting example, lactates and triethanolamines, and mixtures, for example delayed with hydroxyacetic acid. Any other chemical additives may be used or included provided that they are tested for compatibility with the viscoelastic surfactant. For example, some of the standard crosslinkers or polymers as concentrates usually contain materials such as isopropanol, n-propanol, methanol or diesel oil.

The viscoelastic surfactant can generally be any viscoelastic surfactant. The surfactant is present in a low weight percent concentration. Some suitable concentrations of surfactant are about 0.001% to about 1.5% by weight, from about 0.01% to about 0.75% by weight, or even about 0.25%, about 0.5% or about 0.75% by weight.

However, it should be noted the effect of increasing VES concentration is not limited to 1.5% by weight. The increase in viscosity due to the addition VES appears to increase in an approximately linear manner with increasing concentration of VES up to 1.5%, the highest concentration tested. While economically it makes less sense to include higher VES concentrations it is reasonable to presume that the same linear increase in viscosity will occur with higher concentrations of VES.

The VES may be selected from the group consisting of cationic, anionic, zwitterionic, amphoteric, nonionic and combinations thereof. Some non-limiting examples are those cited in U.S. Pat. No. 6,435,277 (Qu et al.) and U.S. Pat. No. 6,703,352 (Dahayanake et al.), each of which are incorporated herein by reference. The viscoelastic surfactants, when used alone or in combination, are capable of forming micelles that form a structure in an aqueous environment that contribute to the increased viscosity of the fluid (also referred to as "viscosifying micelles"). These fluids are normally prepared by mixing in appropriate amounts of VES suitable to achieve the desired viscosity. The viscosity of VES fluids may be attributed to the three dimensional structure formed by the components in the fluids. When the concentration of surfactants in a viscoelastic fluid significantly exceeds a critical concentration, and in most cases in the presence of an electrolyte, surfactant molecules aggregate into species such as micelles, which can interact to form a network exhibiting viscous and elastic behavior.

Non-limiting examples of suitable viscoelastic surfactants useful for viscosifying some fluids include cationic surfactants, anionic surfactants, zwitterionic surfactants, amphoteric surfactants, nonionic surfactants, and combinations thereof.

In general, particularly suitable zwitterionic surfactants have the formula:

RCONH—$(CH_2)_a(CH_2CH_2O)_m(CH_2)_b$—$N^+(CH_3)_2$— $(CH_2)_{a'}(CH_2CH_2O)_{m'}(CH_2)_{b'}COO^-$ in which R is an alkyl group that contains from about 11 to about 23 carbon atoms which may be branched or straight chained and which may be saturated or unsaturated; a, b, a', and b' are each from 0 to 10 and m and m' are each from 0 to 13; a and b are each 1 or 2 if m is not 0 and (a+b) is from 2 to 10 if m is 0; a' and b' are each 1 or 2 when m' is not 0 and (a'+b') is from 1 to 5 if m is 0; (m+m') is from 0 to 14; and $CH_2CH_2O$ may also be $OCH_2CH_2$.

In an embodiment of the invention, a zwitterionic surfactants of the family of betaine is used. Two suitable examples of betaines are BET-O and BET-E. The surfactant in BET-O-30 is shown below; one chemical name is oleylamidopropyl betaine. It is designated BET-O-30 because as obtained from the supplier (Rhodia, Inc. Cranbury, N.J., U. S. A.) it is called Mirataine BET-O-30 because it contains an oleyl acid amide group (including a $C_{17}H_{33}$ alkene tail group) and contains about 30% active surfactant; the remainder is substantially water, sodium chloride, and propylene glycol. An analogous material, BET-E-40, is also available from Rhodia and contains an erucic acid amide group (including a $C_{21}H_{41}$ alkene tail group) and is approximately 40% active ingredient, with the remainder being substantially water, sodium chloride, and isopropanol. VES systems, in particular BET-E-40, optionally contain about 1% of a condensation product of a naphthalene sulfonic acid, for example sodium polynaphthalene sulfonate, as a rheology modifier, as described in U. S. Patent Application Publication No. 2003-0134751. The surfactant in BET-E-40 is also shown below; one chemical name is erucylamidopropyl betaine. As-received concentrates of BET-E-40 were used in the experiments reported below, where they will be referred to as "VES". BET surfactants, and other VES's that are suitable for the embodiments according to the invention, are described in U.S. Pat. No. 6,258,859. According to that patent, BET surfactants make viscoelastic gels when in the presence of certain organic acids, organic acid salts, or inorganic salts; in that patent, the inorganic salts were present at a weight concentration up to about 30%. Co-surfactants may be useful in extending the brine tolerance, and to increase the gel strength and to reduce the shear sensitivity of the VES-fluid, in particular for BET-O-type surfactants. An example given in U.S. Pat. No. 6,258,859 is sodium dodecylbenzene sulfonate (SDBS), also shown below. Other suitable co-surfactants include, for example those having the SDBS-like structure in which x=5-15; other co-surfactants are those in which x=7-15. Still other suitable co-surfactants for BET-O-30 are certain chelating agents such as trisodium hydroxyethylethylenediamine triacetate. The rheology enhancers of the embodiments according to the invention may be used with viscoelastic surfactant fluid systems that contain such additives as co-surfactants, organic acids, organic acid salts, and/or inorganic salts.

Surfactant in BET-O-30 (when $n$ = 3 and $p$ = 1)

Surfactant in BET-E-40 (when $n$ = 3 and $p$ = 1)

SDBS (when $x$ = 11 and the counter-ion is $Na^+$)

Some embodiments use betaines; for example BET-E-40. Although experiments have not been performed, it is believed that mixtures of betaines, especially BET-E-40, with other surfactants are also suitable. Such mixtures are within the scope of embodiments of the invention.

Other betaines that are suitable include those in which the alkene side chain (tail group) contains 17-23 carbon atoms (not counting the carbonyl carbon atom) which may be branched or straight chained and which may be saturated or unsaturated, n=2-10, and p=1-5, and mixtures of these compounds. Some betaines are those in which the alkene side chain contains 17-21 carbon atoms (not counting the carbonyl carbon atom) which may be branched or straight chained and which may be saturated or unsaturated, n=3-5, and p=1-3, and mixtures of these compounds. These surfactants are used at a concentration of about 0.5 to about 10%, or from about 1 to about 5%, or even from about 1.5 to about 4.5%.

Exemplary cationic viscoelastic surfactants include the amine salts and quaternary amine salts disclosed in U.S. Pat. Nos. 5,979,557, and 6,435,277 which have a common Assignee as the present application and which are hereby incorporated by reference. Examples of suitable cationic viscoelastic surfactants include cationic surfactants having the structure:

$R_1N^+(R_2)(R_3)(R_4)X^-$ in which $R_1$ has from about 14 to about 26 carbon atoms and may be branched or straight chained, aromatic, saturated or unsaturated, and may contain a carbonyl, an amide, a retroamide, an imide, a urea, or an amine; $R_2$, $R_3$, and $R_4$ are each independently hydrogen or a $C_1$ to about $C_6$ aliphatic group which may be the same or different, branched or straight chained, saturated or unsaturated and one or more than one of which may be substituted with a group that renders the $R_2$, $R_3$, and $R_4$ group more hydrophilic; the $R_2$, $R_3$ and $R_4$ groups may be incorporated into a heterocyclic 5- or 6-member ring structure which includes the nitrogen atom;

the $R_2$, $R_3$ and $R_4$ groups may be the same or different; $R_1$, $R_2$, $R_3$ and/or $R_4$ may contain one or more ethylene oxide and/or propylene oxide units; and $X^-$ is an anion. Mixtures of such compounds are also suitable. As a further example, $R_1$ is from about 18 to about 22 carbon atoms and may contain a carbonyl, an amide, or an amine, and $R_2$, $R_3$, and $R_4$ are the same as one another and contain from 1 to about 3 carbon atoms.

Cationic surfactants having the structure $R_1N^+(R_2)(R_3)(R_4)X^-$ may optionally contain amines having the structure $R_1N(R_2)(R_3)$. It is well known that commercially available cationic quaternary amine surfactants often contain the corresponding amines (in which $R_1$, $R_2$, and $R_3$ in the cationic surfactant and in the amine have the same structure). As received commercially available VES surfactant concentrate formulations, for example cationic VES surfactant formulations, may also optionally contain one or more members of the group consisting of alcohols, glycols, organic salts, chelating agents, solvents, mutual solvents, organic acids, organic acid salts, inorganic salts, oligomers, polymers, co-polymers, and mixtures of these members. They may also contain performance enhancers, such as viscosity enhancers, for example polysulfonates, for example polysulfonic acids, as described in U.S. Pat. No. 7,084,095 which is hereby incorporated by reference.

Another suitable cationic VES is erucyl bis(2-hydroxyethyl) methyl ammonium chloride, also known as (Z)-13 docosenyl-N—N-bis (2-hydroxyethyl) methyl ammonium chloride. It is commonly obtained from manufacturers as a mixture containing about 60 weight percent surfactant in a mixture of isopropanol, ethylene glycol, and water. Other suitable amine salts and quaternary amine salts include (either alone or in combination in accordance with the invention), erucyl trimethyl ammonium chloride; N-methyl-N,N-bis(2-hydroxyethyl) rapeseed ammonium chloride; oleyl methyl bis(hydroxyethyl) ammonium chloride; erucylamidopropyltrimethylamine chloride, octadecyl methyl bis(hydroxyethyl) ammonium bromide; octadecyl tris(hydroxyethyl) ammonium bromide; octadecyl dimethyl hydroxyethyl ammonium bromide; cetyl dimethyl hydroxyethyl ammonium bromide; cetyl methyl bis(hydroxyethyl) ammonium salicylate; cetyl methyl bis(hydroxyethyl) ammonium 3,4,-dichlorobenzoate; cetyl tris(hydroxyethyl) ammonium iodide; cosyl dimethyl hydroxyethyl ammonium bromide; cosyl methyl bis(hydroxyethyl) ammonium chloride; cosyl tris(hydroxyethyl) ammonium bromide; dicosyl dimethyl hydroxyethyl ammonium bromide; dicosyl methyl bis(hydroxyethyl) ammonium chloride; dicosyl tris(hydroxyethyl) ammonium bromide; hexadecyl ethyl bis(hydroxyethyl) ammonium chloride; hexadecyl isopropyl bis(hydroxyethyl) ammonium iodide; and cetylamino, N-octadecyl pyridinium chloride.

Many fluids made with viscoelastic surfactant systems, for example those containing cationic surfactants having structures similar to that of erucyl bis(2-hydroxyethyl) methyl ammonium chloride, inherently have short re-heal times and the rheology enhancers of the embodiments according to the invention may not be needed except under special circumstances, for example at very low temperature.

Amphoteric viscoelastic surfactants are also suitable. Exemplary amphoteric viscoelastic surfactant systems include those described in U.S. Pat. No. 6,703,352, for example amine oxides. Other exemplary viscoelastic surfactant systems include those described in U.S. Pat. Nos. 6,239,183; 6,506,710; 7,060,661; 7,303,018; and 7,510,009 for example amidoamine oxides. These references are hereby incorporated in their entirety. Mixtures of zwitterionic surfactants and amphoteric surfactants are suitable. An example is a mixture of about 13% isopropanol, about 5% 1-butanol, about 15% ethylene glycol monobutyl ether, about 4% sodium chloride, about 30% water, about 30% cocoamidopropyl betaine, and about 2% cocoamidopropylamine oxide.

The viscoelastic surfactant system may also be based upon any suitable anionic surfactant. In some embodiments, the anionic surfactant is an alkyl sarcosinate. The alkyl sarcosinate can generally have any number of carbon atoms. Alkyl sarcosinates can have about 12 to about 24 carbon atoms. The alkyl sarcosinate can have about 14 to about 18 carbon atoms. Specific examples of the number of carbon atoms include 12, 14, 16, 18, 20, 22, and 24 carbon atoms. The anionic surfactant is represented by the chemical formula:

$$R_1CON(R_2)CH_2X$$

wherein $R_1$ is a hydrophobic chain having about 12 to about 24 carbon atoms, $R_2$ is hydrogen, methyl, ethyl, propyl, or butyl, and X is carboxyl or sulfonyl. The hydrophobic chain can be an alkyl group, an alkenyl group, an alkylarylalkyl group, or an alkoxyalkyl group. Specific examples of the hydrophobic chain include a tetradecyl group, a hexadecyl group, an octadecentyl group, an octadecyl group, and a docosenoic group.

To provide the ionic strength for the desired micelle formation, in some cases, the treatment fluids of the embodiments according to the invention may comprise a water-soluble salt. Adding a salt may help promote micelle formation for the viscosification of the fluid in some instances. In some embodiments, the aqueous base fluid may contain the water-soluble salt, for example, where saltwater, a brine, or seawater is used as the aqueous base fluid. Suitable water-soluble salts may comprise lithium, ammonium, sodium, potassium, cesium, magnesium, calcium, or zinc cations, and chloride, bromide, iodide, formate, nitrate, acetate, cyanate, or thiocyanate anions. Examples of suitable water-soluble salts that comprise the above-listed anions and cations include, but are not limited to, ammonium chloride, lithium bromide, lithium chloride, lithium formate, lithium nitrate, calcium bromide, calcium chloride, calcium nitrate, calcium formate, sodium bromide, sodium chloride, sodium formate, sodium nitrate, potassium chloride, potassium bromide, potassium nitrate, potassium formate, cesium nitrate, cesium formate, cesium chloride, cesium bromide, magnesium chloride, magnesium bromide, zinc chloride, and zinc bromide.

The composition also typically contains proppants. The selection of a proppant involves many compromises imposed by economical and practical considerations. Criteria for selecting the proppant type, size, and concentration is based on the needed dimensionless conductivity, and can be selected by a skilled artisan. Such proppants can be natural or synthetic (including but not limited to glass beads, ceramic beads, sand, and bauxite), coated, or contain chemicals; more than one can be used sequentially or in mixtures of different sizes or different materials. The proppant may be resin coated, or pre-cured resin coated, provided that the resin and any other chemicals that might be released from the coating or come in contact with the other chemicals of the Invention are compatible with them. Proppants and gravels in the same or different wells or treatments can be the same material and/or the same size as one another and the term "proppant" is intended to include gravel in this discussion. In general the proppant used will have an average particle size of from about 0.15 mm to about 2.39 mm (about 8 to about 100 U.S. mesh), more particularly, but not limited to 0.25 to 0.43 mm (40/60 mesh), 0.43 to 0.84 mm (20/40 mesh), 0.84 to 1.19 mm (16/20), 0.84 to 1.68 mm (12/20 mesh) and 0.84 to 2.39 mm (8/20 mesh) sized materials. Normally the proppant will be present in the slurry in a concentration of from about 0.12 to about 0.96 kg/L, or from about 0.12 to about 0.72 kg/L, or from about 0.12 to about 0.54 kg/L. The fluid may also contain other enhancers or additives.

In other embodiments, the composition may further comprise an additive for maintaining and/or adjusting pH (e.g., pH buffers, pH adjusting agents, etc.). For example, the additive for maintaining and/or adjusting pH may be included in the treatment fluid so as to maintain the pH in, or adjust the pH to, a desired range and thereby maintain, or provide, the necessary ionic strength to form the desired micellar structures. Examples of suitable additives for maintaining and/or adjusting pH include, but are not limited to, sodium acetate, acetic acid, sodium carbonate, potassium carbonate, sodium bicarbonate, potassium bicarbonate, sodium or potassium diacetate, sodium or potassium phosphate, sodium or potassium hydrogen phosphate, sodium or potassium dihydrogen phosphate, sodium hydroxide, potassium hydroxide, lithium hydroxide, combinations thereof, derivatives thereof, and the like. The additive for adjusting and/or maintaining pH may be present in the treatment fluids of the embodiments according to the invention in an amount sufficient to maintain and/or adjust the pH of the fluid. One of ordinary skill in the art, with the benefit of this disclosure, will recognize the appropriate additive for maintaining and/or adjusting pH and amount thereof to use for a chosen application.

In some embodiments, the composition may optionally comprise additional additives, including, but not limited to, acids, fluid loss control additives, gas, corrosion inhibitors, scale inhibitors, catalysts, clay control agents, biocides, friction reducers, combinations thereof and the like. For example, in some embodiments, it may be desired to foam the composition using a gas, such as air, nitrogen, or carbon dioxide. In one certain embodiment, the composition may contain a particulate additive, such as a particulate scale inhibitor.

According to the invention, the composition may be used for carrying out a variety of subterranean treatments, where a viscosified treatment fluid may be used, including, but not limited to, drilling operations, fracturing treatments, and completion operations (e.g., gravel packing). In some embodiments, the treatment fluids may be used in treating a portion of a subterranean formation. In certain embodiments, the composition may be introduced into a well bore that penetrates the subterranean formation. Optionally, the treatment fluid further may comprise particulates and other additives suitable for treating the subterranean formation. For example, the treatment fluid may be allowed to contact the subterranean formation for a period of time sufficient to reduce the viscosity of the treatment fluid. In some embodiments, the treatment fluid may be allowed to contact hydrocarbons, formations fluids, and/or subsequently injected treatment fluids, thereby reducing the viscosity of the treatment fluid. After a chosen time, the treatment fluid may be recovered through the well bore.

In certain embodiments, the treatment fluids may be used in fracturing treatments. In the fracturing embodiments, the composition may be introduced into a well bore that penetrates a subterranean formation at or above a pressure sufficient to create or enhance one or more fractures in a portion of the subterranean formation. Generally, in the fracturing embodiments, the composition may exhibit viscoelastic behavior which may be due. Optionally, the treatment fluid further may comprise particulates and other additives suitable for the fracturing treatment. After a chosen time, the treatment fluid may be recovered through the well bore.

The composition according to the invention provides the following benefits when fracturing permeable formations in the 50 to 90 deg C. temperature range, or even the 54 to 82 deg C. temperature range: higher viscosity at a given temperature with lower polymer concentration (71.1 deg C. at a shear rate of 100 s/s and 25 minutes at temperature—prior art fluid 130 cp, fluid according to the invention 210 cp); improved fluid loss control (static leakoff test in an 80 mD core at 71.1 deg C.—prior art fluid spurt loss 4.81, $C_w$=0.006088, fluid according to the invention spurt loss 2.61, $C_w$=0.001598); improved shear recovery (viscosity at 100/s after 2 minutes shear at 100/s—prior art fluid 100 cp, fluid according to the invention 175 cp); less sensitive to the presence of surfactants and de-emulsifiers.

The method of the invention is also suitable for gravel packing, or for fracturing and gravel packing in one operation (called, for example frac and pack, frac-n-pack, frac-pack, StimPac treatments, or other names), which are also used extensively to stimulate the production of hydrocarbons, water and other fluids from subterranean formations. These operations involve pumping a slurry of "proppant" (natural or synthetic materials that prop open a fracture after it is created) in hydraulic fracturing or "gravel" in gravel packing. In low permeability formations, the goal of hydraulic fracturing is generally to form long, high surface area fractures that greatly increase the magnitude of the pathway of fluid flow from the formation to the wellbore. In high permeability formations, the goal of a hydraulic fracturing treatment is typically to create a short, wide, highly conductive fracture, in order to bypass near-wellbore damage done in drilling and/or completion, to ensure good fluid communication between the rock and the wellbore and also to increase the surface area available for fluids to flow into the wellbore.

Gravel is also a natural or synthetic material, which may be identical to, or different from, proppant. Gravel packing is used for "sand" control. Sand is the name given to any particulate material from the formation, such as clays, that could be carried into production equipment. Gravel packing is a sand-control method used to prevent production of formation sand, in which, for example a steel screen is placed in the wellbore and the surrounding annulus is packed with prepared gravel of a specific size designed to prevent the passage of formation sand that could foul subterranean or surface equipment and reduce flows. The primary objective of gravel packing is to stabilize the formation while causing minimal impairment to well productivity. Sometimes gravel packing is done without a screen. High permeability formations are frequently poorly consolidated, so that sand control is needed; they may also be damaged, so that fracturing is also needed. Therefore, hydraulic fracturing treatments in which short, wide fractures are wanted are often combined in a single continuous ("frac and pack") operation with gravel packing. For simplicity, in the following we may refer to any one of hydraulic fracturing, fracturing and gravel packing in one operation (frac and pack), or gravel packing, and mean them all.

To facilitate a better understanding of the invention, the following examples of embodiments are given. In no way should the following examples be read to limit, or define, the scope of the invention.

EXAMPLES

A series of experiments were conducted to compare viscosity and fluid loss control of prior art samples made of crosslinked polymer fluid comprising guar polymer and of samples according to the invention at different temperatures. The temperature range over which most of the test were conducted was 45° C. to 95° C.

Rheology Experiments

To illustrate some embodiments according to the invention, a comparison is made between a prior art fluid made of guar polymer and a fluid according to the invention further comprising a VES made of erucic amidopropyl dimethyl betaine (0.5% by weight), ethoxylated linear alcohols (0.2% by weight) and non-emulsifying agent (0.1% by weight).

Figure 1:
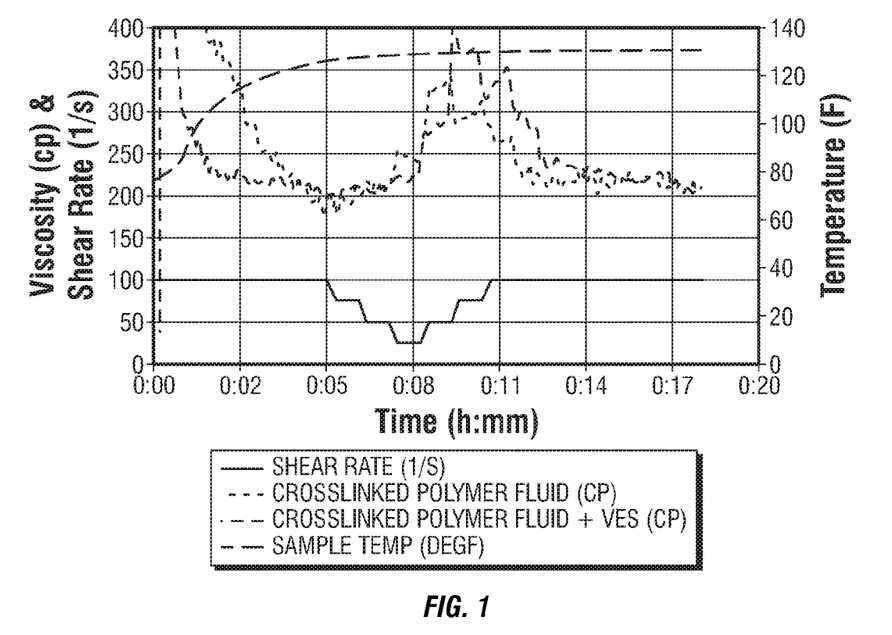
FIG. 1 shows graph comparing viscosity of crosslinked polymer fluid alone and crosslinked polymer fluid and VES at 54.4 deg C.

FIG. 1 shows viscosity profile over time for a first fluid made of guar polymer and a second fluid made of guar polymer with erucic amidopropyl dimethyl betaine (0.5% by weight), ethoxylated linear alcohols (0.2% by weight) and non-emulsifying agent (0.1% by weight). Tests are conducted at temperature of 54.4° C. A small increase in the viscosity can be noted compared to prior art fluid.

Figure 2:
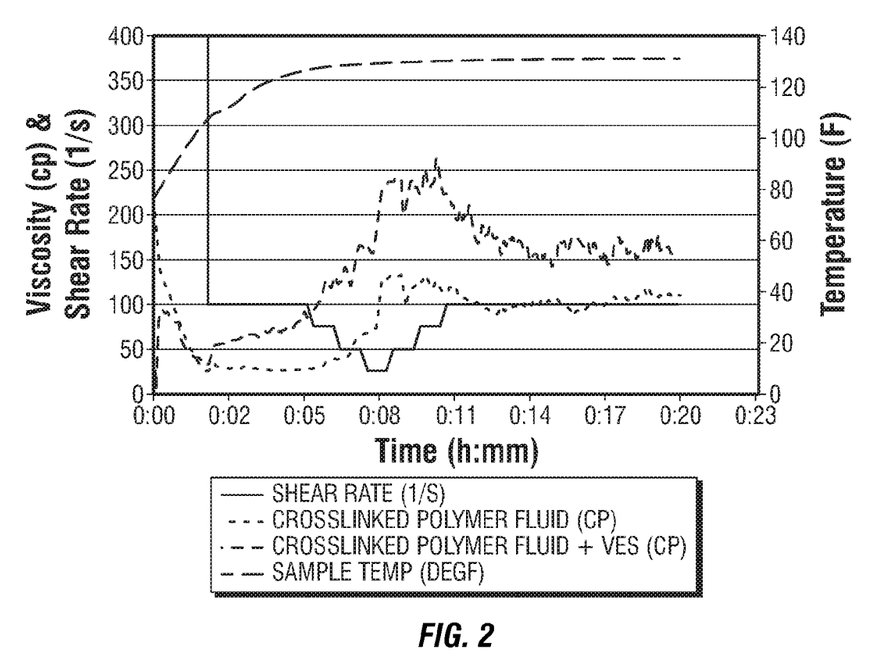
FIG. 2 shows graph comparing viscosity of crosslinked polymer fluid alone and crosslinked polymer fluid and VES at 54.4 deg C. with shear 2 minutes at 1000/s.

FIG. 2 shows shear recovery after 2 min of 1000/s shear for a first fluid made of guar polymer and a second fluid made of guar polymer with erucic amidopropyl dimethyl betaine (0.5% by weight), ethoxylated linear alcohols (0.2% by weight) and non-emulsifying agent. Tests are conducted at temperature of 54.4° C. Clearly an increase in the viscosity can be noted compared to prior art fluid.

Figure 3:
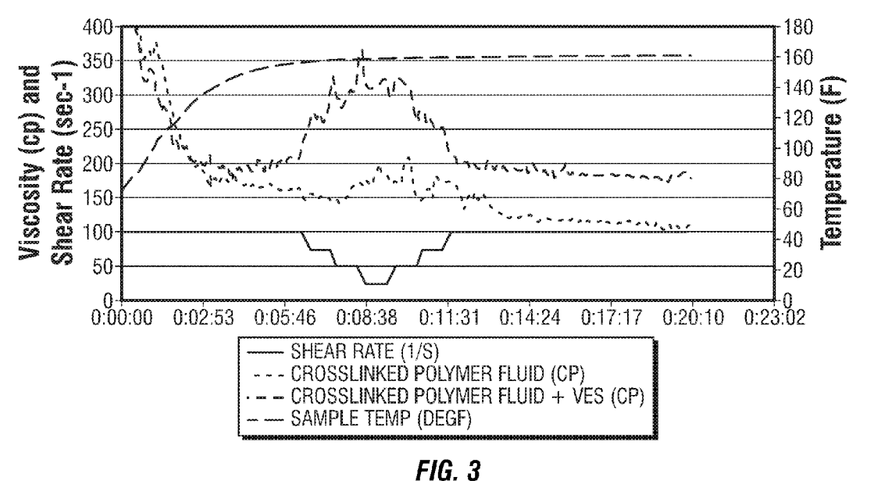
FIG. 3 shows graph comparing viscosity of crosslinked polymer fluid alone and crosslinked polymer fluid and VES at 71.1 deg C.

FIG. 3 shows viscosity profile over time for a first fluid made of guar polymer and a second fluid made of guar polymer with erucic amidopropyl dimethyl betaine (0.5% by weight), ethoxylated linear alcohols (0.2% by weight) and non-emulsifying agent (0.1% by weight). Tests are conducted at temperature of 71.1° C. An increase in the viscosity can be noted compared to prior art fluid and compared to that one at 54.4° C.

Figure 4:
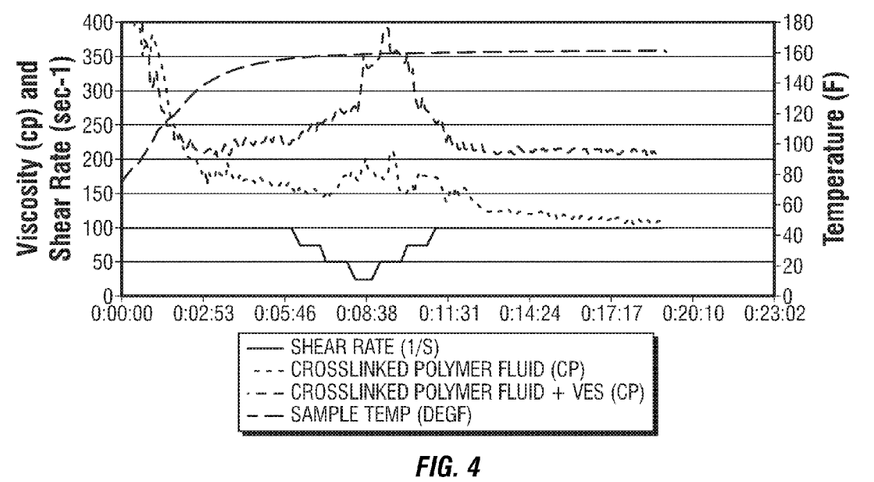
FIG. 4 shows graph comparing viscosity of crosslinked polymer fluid alone and crosslinked polymer fluid and VES for a different concentration at 71.1 deg C.

FIG. 4 shows viscosity profile over time for a first fluid made of guar polymer and a second fluid made of guar polymer with erucic amidopropyl dimethyl betaine (0.75% by weight), ethoxylated linear alcohols (0.2% by weight) and non-emulsifying agent (0.1% by weight). Tests are conducted at temperature of 71.1° C. An increase in the viscosity can be noted compared to prior art fluid and previous results.

Figure 5:
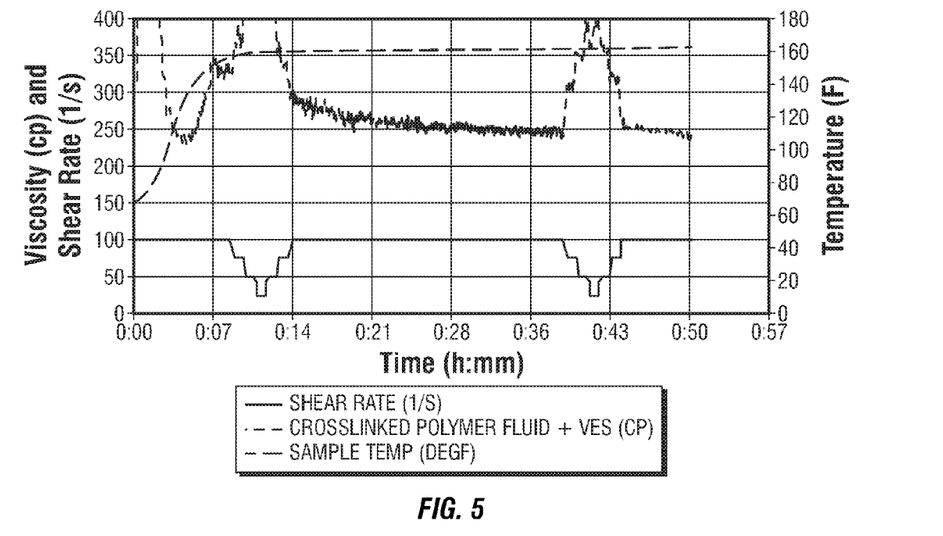
FIG. 5 shows graph of the viscosity of crosslinked polymer fluid and VES for a different concentration at 71.1 deg C.

FIG. 5 shows viscosity profile over time for a fluid made of guar polymer with erucic amidopropyl dimethyl betaine (0.75% by weight) and non-emulsifying agent (0.5% by weight). Tests are conducted at temperature of 71.1° C. An increase in the viscosity can be noted for the fluid according to the invention.

Figure 6:
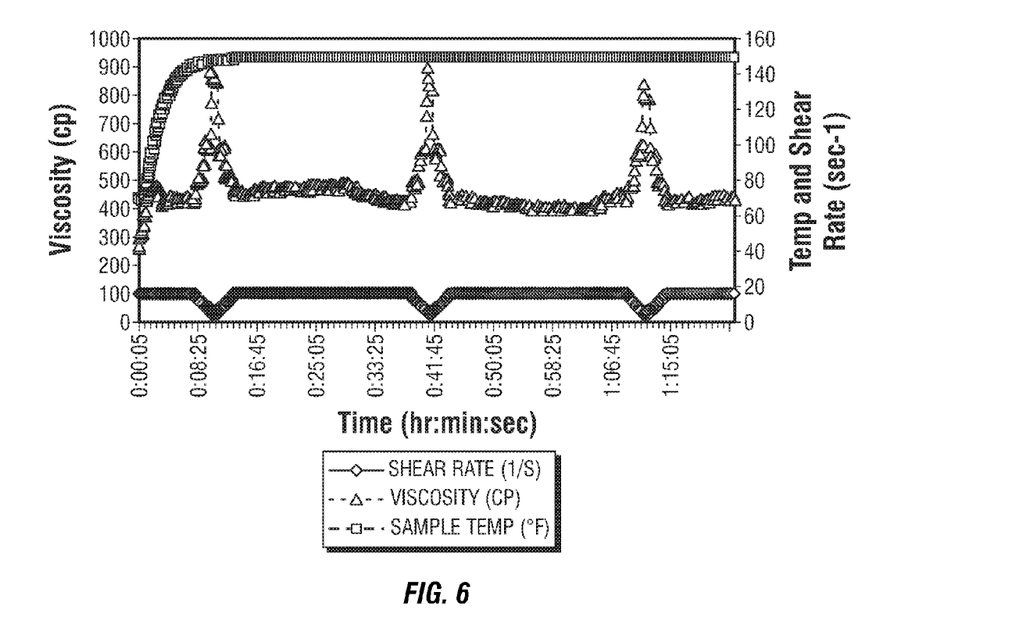
FIG. 6 shows graph of the viscosity of crosslinked polymer fluid and VES at 82.2 deg C.

FIG. 6 shows viscosity profile over time for a fluid made of guar polymer with erucic amidopropyl dimethyl betaine (0.75% by weight). Tests are conducted at temperature of 82.2° C. An increase in the viscosity can be noted for the fluid according to the invention.

Figure 7:
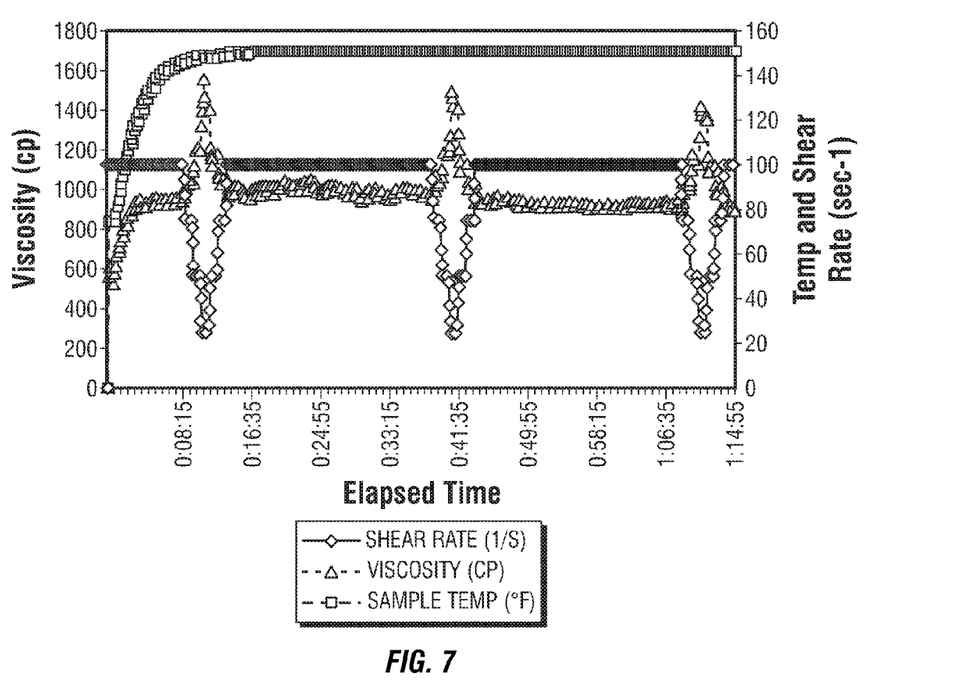
FIG. 7 shows graph of the viscosity of crosslinked polymer fluid and VES for a different concentration at 82.2 deg C.

FIG. 7 shows viscosity profile over time for a fluid made of guar polymer with erucic amidopropyl dimethyl betaine (0.75% by weight) and non-emulsifying agent (0.5% by weight). Tests are conducted at temperature of 82.2° C. An increase in the viscosity can be noted for the fluid according to the invention.

Fluid Loss Control

Figure 8:
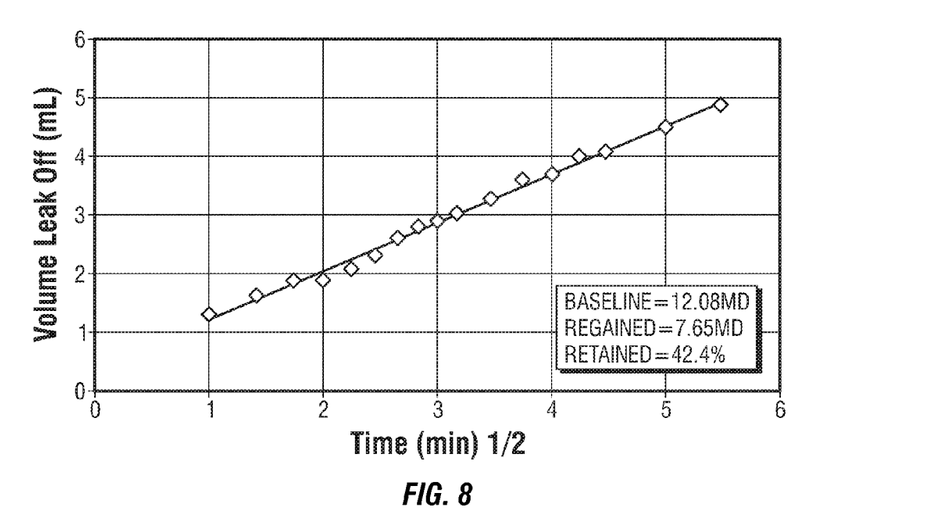
FIG. 8 shows fluid loss of the composition according to one embodiment of the invention at 71.1 deg C.

To illustrate some embodiments according to the invention, tests were run at 71.1° C. as follows: establish baseline permeability to 2% KCl, perform static leakoff test with fracturing fluid (30 in. 500 psi) and measure retained permeability to 2% KCl at increasing differential pressure up to 250 psi. A test was run with 0.25% by weight of VES in a core with an effective permeability to water of 18 mD shown on FIG. 8. Despite the relatively high permeability the values of both spurt loss and $C_w$ were much lower than what is reported in the specification for crosslinked polymer fluid made of guar at 65.5° C. in a 1 mD core (see Table 1 below).

TABLE 1

| T (deg C.) | Permeability (md) | $C_w$ (ft/min$^{1/2}$) | Spurt (galUS/100 ft$^2$) |
|---|---|---|---|
| 38 | 0.76 | 0.0017 | 1.62 |
| 52 | 0.77 | 0.0016 | 0.15 |
| 66 | 0.73 | 0.0023 | 5.17 |

Figure 9:
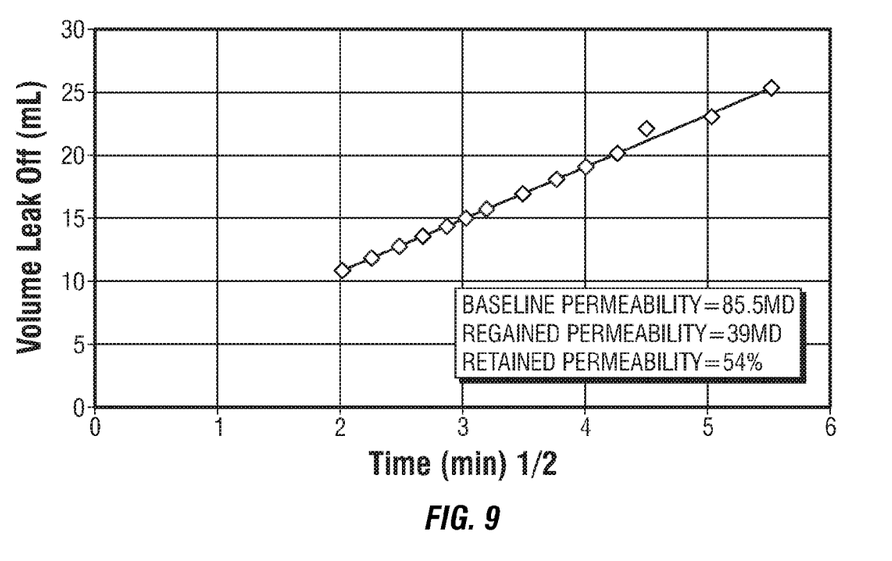
FIG. 9, FIG. 10 and FIG. 11 show comparison of fluid loss control between composition of crosslinked polymer fluid alone and two compositions of crosslinked polymer fluid with different concentration of VES at 71.1 deg C.
Figure 10:
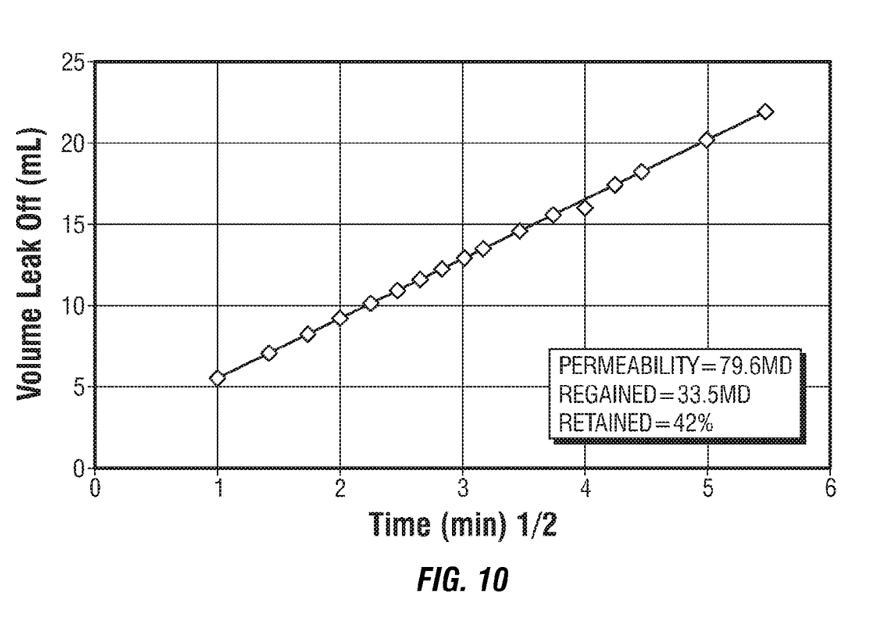
Figure 11:
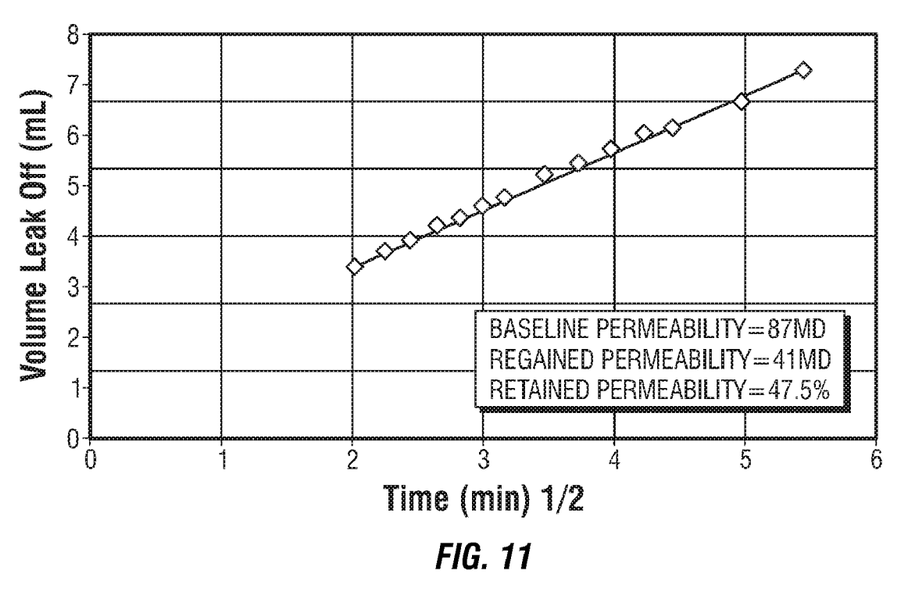

Series of tests were run in a high permeability core: 85 mD with no VES, and after with 0.1% by weight or 0.5% by weight VES made of erucic amidopropyl dimethyl betaine. Results indicate that the fluid loss control of the fluid is improved with increasing concentrations of VES as shown on FIGS. 9, 10 and 11.

Table 2 shows the viscosity of VES 0.1% versus temperature. This table clearly shows that there is a synergistic effect when using guar and VES together, rather than simply summing the viscosity of the two components.

TABLE 2

| Formulation | Temperature | | n' | k' | Viscosities (cP) at Shear Rates | | |
|---|---|---|---|---|---|---|---|
| | deg F. | deg C. | | | 40 s$^{-1}$ | 100 s$^{-1}$ | 170 s$^{-1}$ |
| VES 10 galUS/1,000 galUS, KCl: 167 lanv 1,000 galUS | 74 | 23 | 0.3020 | 0.0139 | 51 | 27 | 18 |
| | 109 | 43 | 0.4420 | 0.0073 | 45 | 27 | 20 |
| | 127 | 53 | 0.3740 | 0.0151 | 72 | 40 | 29 |
| | 147 | 64 | 0.5630 | 0.0035 | 33 | 22 | 18 |
| | 172 | 78 | 0.1660 | 0.0134 | 30 | 14 | 9 |
| | 197 | 92 | 0.2230 | 0.0095 | 26 | 13 | 8 |
| | 217 | 103 | 0.2680 | 0.0063 | 20 | 10 | 7 |
| | 238 | 114 | 0.1700 | 0.0070 | 16 | 7 | 5 |
| | 256 | 124 | 0.1040 | 0.0077 | 14 | 6 | 4 |
| | 271 | 133 | 0.0760 | 0.0082 | 13 | 6 | 3 |
| | 294 | 146 | 0.0260 | 0.0107 | 14 | 6 | 3 |

Optimization

At 54.4 deg C. there is little difference in the rheology of the crosslinked polymer fluid with or without VES. However, the fluid loss control/efficiency of the fluid is greatly improved (shown on FIG. 8) as is the shear recovery (shown on FIG. 2). At each temperature there is an optimum concentration of VES: 0.25% by weight at 54.4 deg C. (improved fluid loss control), 0.5% by weight at 65.5 deg C. (improved rheology and fluid loss control), 0.75% by weight at 82.2 deg C. (improved rheology and fluid loss control).

As said before, the temperature range over which most of the test were conducted was 45° C. to 95° C. However, some tests were run at 121° C. with crosslinked guar that showed the same viscosity increase with the addition of VES; although the viscosity of the fluid system (crosslinked guar+VES) was considerably lower due to the temperature. The viscosity at 121° C. was 110 cp at 100 $s^{-1}$ and 160 cp at 100 $s^-$ with the addition of 0.75% VES. It is not unreasonable to believe that this effect would be seen at even higher temperatures.

It is clear that the invention is well adapted to carry out its objectives and attain the ends and advantages mentioned above as well as those inherent therein. While embodiments of the invention have been described in varying detail for purposes of disclosure, it will be understood that numerous changes may be made which will readily suggest themselves to those skilled in the art and which are encompassed within the spirit of the invention disclosed and as defined in the written description and appended claims.

What is claimed is:

1. A method to increase the viscosity of a fluid, the method comprising:
    a. providing a fluid comprising a thickening amount of a crosslinked polymer;
    b. adding a viscoelastic surfactant at a given concentration to the fluid;
    c. taking the fluid to a given temperature;
    d. defining a viscosity profile of the fluid depending of the concentration and the temperature;
    e. comparing said viscosity profile to a viscosity profile of the crosslinked polymer fluid alone; and
    f. defining an optimum concentration of the viscoelastic surfactant for each temperature.

2. The method of claim 1, wherein the given temperature is between 45 degrees Celsius and 95 degrees Celsius.

3. The method of claim 1, wherein the crosslinked polymer is taken in the group consisting of: polysaccharides, substituted galactomannans, guar gums, high-molecular weight polysaccharides composed of mannose and galactose sugars, guar derivatives, hydroxypropyl guar (HPG), carboxymethylhydroxypropyl guar (CMHPG), carboxymethyl guar (CMG), hydrophobically modified guars, guar-containing compounds, synthetic polymers and mixtures thereof.

4. The method of claim 1, wherein the viscoelastic surfactant is zwitterionic surfactant.

5. The method of claim 4, wherein the viscoelastic surfactant is betaine.

6. The method of claim 1, further comprising contacting the fluid and the subterranean formation.

7. The method of claim 6, further comprising fracturing the subterranean formation.

8. The method of claim 1, wherein the fluid further comprises proppant.

9. The method of claim 1, wherein the carrier fluid is water.

10. The method of claim 1, wherein the fluid further comprises a co-surfactant.

11. The method of claim 1, wherein the optimum concentration of the viscoelastic surfactant is less than about 1.5% by weight.

12. The method of claim 1, wherein the optimum concentration of the viscoelastic surfactant is less than about 1% by weight.

13. The method of claim 1, wherein the optimum concentration of the viscoelastic surfactant is less than about 0.8% by weight.

* * * * *